May 22, 1945.  J. JANDASEK  2,376,699
TRANSMISSION
Filed May 13, 1941  2 Sheets-Sheet 2
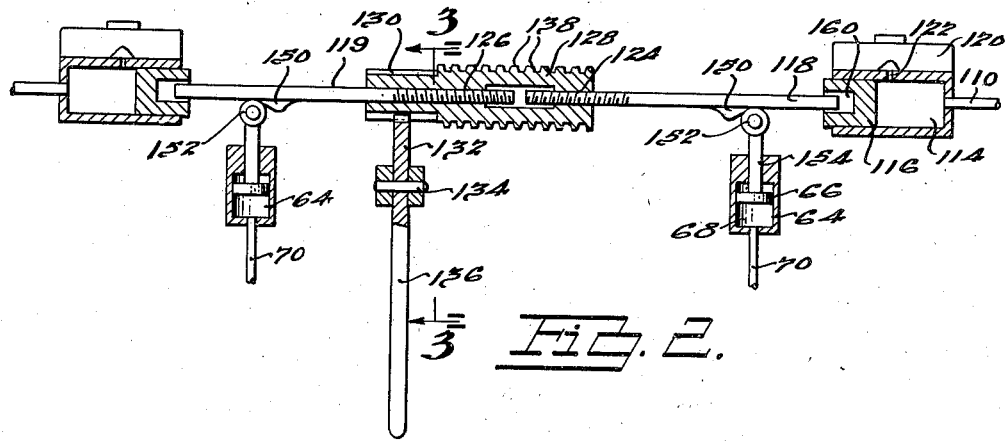
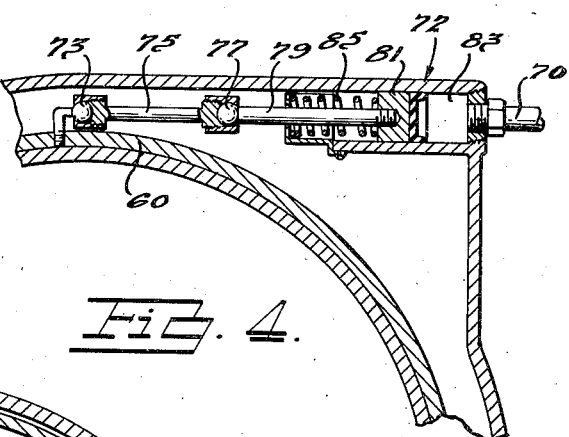
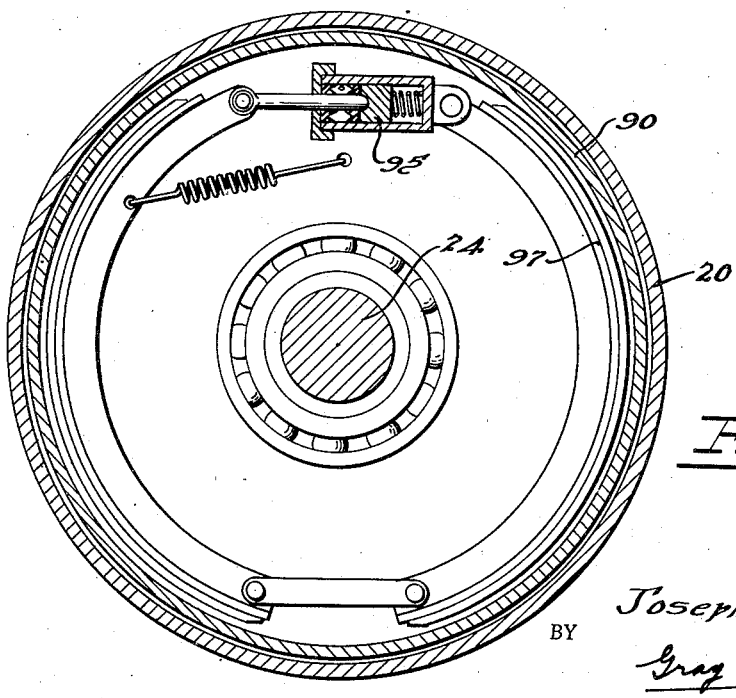
INVENTOR.
Joseph Jandasek.
BY Gray & Smith.

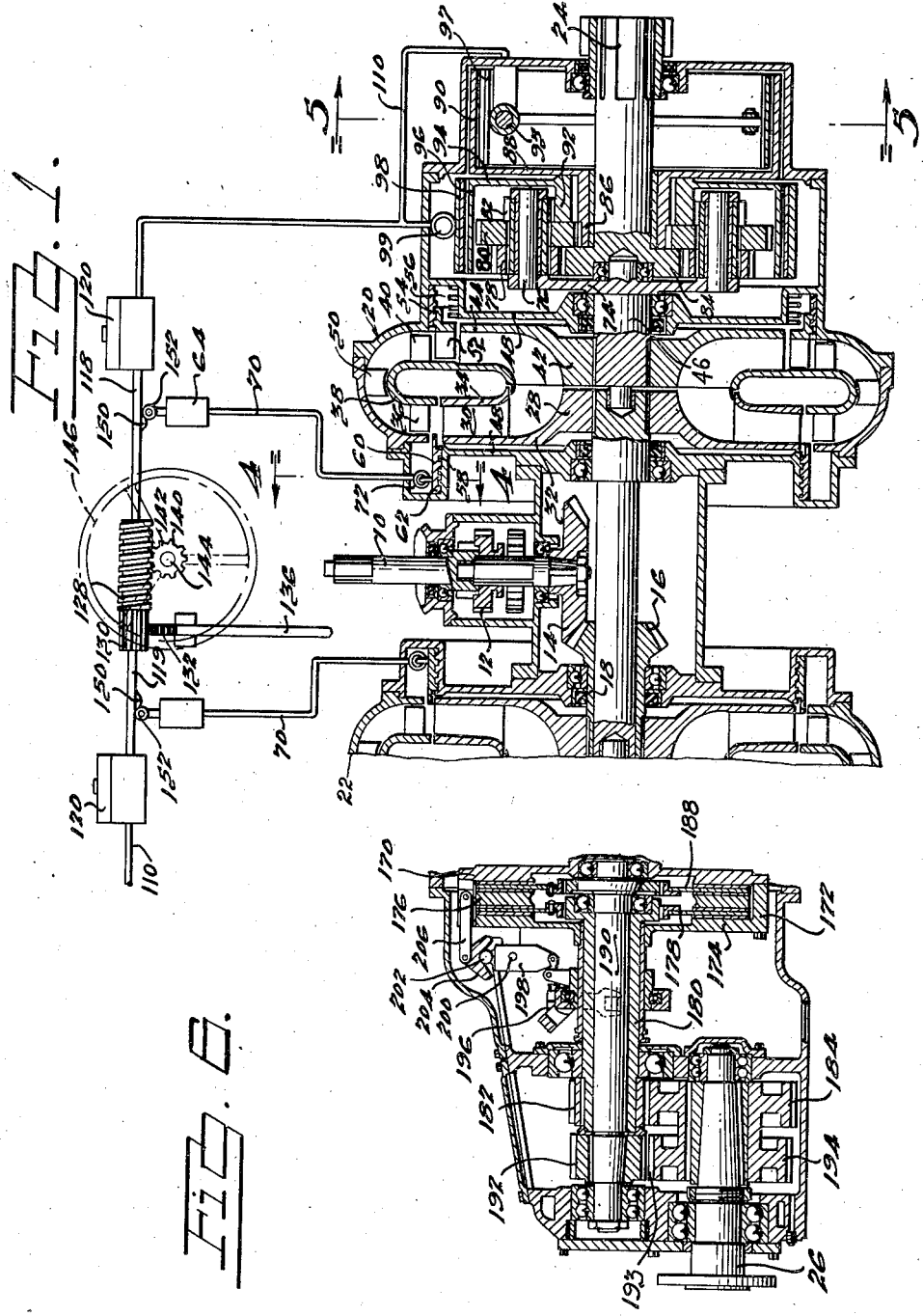

Patented May 22, 1945

2,376,699

UNITED STATES PATENT OFFICE 2,376,699

TRANSMISSION

Joseph Jandasek, Detroit, Mich., assignor to Bendix Aviation Corporation, South Bend, Ind., a corporation of Delaware Application May 13, 1941, Serial No. 393,281

11 Claims. (Cl. 180—9.2)

This invention relates to transmissions.

In the operation of vehicles of the so-called "track layer" type wherein the vehicle rides on an endless track carried by the vehicle and is propelled by moving the track longitudinally of the vehicle, difficulty has been experienced in steering the vehicle because of the absence of steerable wheels. Vehicles of this type are frequently of such large size that it is exceptionally difficult to design a multi-speed planetary transmission in such a manner that the vehicle embodies a desired degree of flexibility of control. One typical example of track laying vehicles wherein such difficulties have been encountered is armored tanks employed for purposes of warfare.

An object of the invention resides in the provision of a plurality of spaced fluid transmissions and manual means for control of the transmissions so as to vary the proportion of power transmitted to a plurality of driven elements.

Another object is to provide a transmission adapted to drive and steer a track laying vehicle.

A further object is to provide a pair of spaced torque converter elements operably connected to drive a pair of spaced movable track members wherein manually operable means are provided to vary the quantity of power transmitted to each track to steer the vehicle.

A further object of the invention resides in the provision of infinitely variable power transmitting means whereby the quantity of power transmitted to a plurality of spaced driven members may be varied through extremely wide limits.

Yet a further object of the invention resides in the provision of a transmission for a track laying vehicle such for example as an armored tank wherein spaced interconnected power transmitting driving means associated with a pair of spaced track members are operative to divide the power in proportion to the load to which each of the track members is subjected.

Another object is to provide a control mechanism for a track laying vehicle wherein a plurality of spaced fluid transmissions may be directly controlled by a manually operable member to vary the proportion of power transmitted by each of the transmissions in accordance with the position of said manually operated member.

A still further object resides in the provision of a steering control for a track laying vehicle wherein steering of the vehicle may be accomplished by progressively interrupting the transmission of power to one of a plurality of spaced track members, and wherein means are provided to apply a progressively increasing braking force on one of said spaced track members to effect a more rapid turn.

Another object is to provide hydrostatic control means for progressively varying the power transmitted to a plurality of spaced track members to vary the proportion of power transmitted by spaced power transmitting means.

A still further object is to provide means for selectively operating one of a pair of spaced power transmitting members as a torque converter and operating the other power transmitting member as a fluid coupling to effect steering of a track laying vehicle.

Another object resides in the provision of a novel control mechanism for a track laying vehicle wherein manually operable means are provided to progressively interrupt power transmission in one direction and thereafter transmit power in the opposite direction to render the steering control of a vehicle more effective.

A further object is to provide a manually controlled hydrostatic means for reducing the quantity of power transmitted by a fluid transmission and later changing the direction of flow of the transmitted power as applied to a driven member.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal sectional view of a transmission embodying the invention.

Fig. 2 is a sectional view of a control mechanism.

Fig. 3 is a cross sectional view of the control mechanism taken substantially on the line 3—3 of Fig. 2.

Fig. 4 is a cross sectional view taken substantially on the line 4—4 of Fig. 1, looking in the direction of the arrows.

Fig. 5 is a cross sectional view taken substantially on the line 5—5 of Fig. 1, looking in the direction of the arrows.

Fig. 6 is a fragmentary sectional view illustrating a modified form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1, it will be observed that a driving shaft 10 which may be driven by any suitable source of power is connected through a two-speed gear box 12 to drive a bevel gear 14 in mesh with a pinion 16 fixed to a driven shaft 18.

As illustrated, the shaft 18 is connected to drive spaced fluid transmissions 20 and 22 which may be of similar design but oppositely disposed. Each of the transmissions 20 and 22 is connected to drive final driven shafts 24 and 26 respectively which may, if desired, be operably connected to drive independent sprocket or track members of a track laying vehicle such for example as an armored tank illustrated in my co-pending applications Serial No. 376,151 and Serial No. 376,152, filed January 27, 1941, now Patents No. 2,352,482 and No. 2,360,234, respectively.

The driving shaft 18 carries an impeller 28 having suitable blades 30 secured between a web 32 and a shroud 34. The impeller energize fluid and the energy of the fluid is absorbed by a three-stage turbine. The first stage of the turbine includes vanes 36 carried by a shroud 38. The second stage of the turbine includes vanes 40 on the shroud 38 and the third stage of the turbine vanes 42 on a web 44 secured to a driven shaft 46.

A stationary housing 48 encloses the impeller and turbine, and is provided with spaced guide wheel or reaction members 50 and 52 respectively. The guide wheel 50 as illustrated may be carried by the stationary housing 48 while the guide wheel 52 may be mounted on cooperating helical threads 54 interposed between the stationary housing 48 and the guide wheel 52 and may be yieldingly urged into the fluid circuit by means of a spring 56 to vary the degree of torque multiplication of the transmission. The guide wheel 52 is provided with blades which are acted upon by fluid reaction exerted within the power transmitting fluid circuit of the transmission to vary the position of the guide wheel 52 within the power transmitting fluid circuit and thereby vary the torque multiplication of the transmission in accordance with the fluid reaction within the circuit.

The stationary housing 48 has an axially extended helically threaded portion 58 for the reception of a valve or shutter member 60 mounted on helical threads 62 cooperating with the helically threaded portion 58 of the stationary housing 48 to be selectively introduced into the power transmitting fluid circuit between the impeller blades 30 and the first stage turbine member 36. As the valve means 60 is introduced into the fluid circuit the circuit is progressively throttled whereby the power transmitted by the transmission is progressively throttled or decreased.

Means may be provided to control the position of the valve 60 within the power transmitting fluid circuit. One desirable control means comprises a cylinder 64 having a piston 66 slidably mounted in the chamber 68 of the cylinder to exert pressure on fluid in the chamber 68 and transmit the fluid through a conduit 70 to exert a force within a hydraulically actuated unit 72 operably connected to actuate the valve 60.

As illustrated in Fig. 4, the hydraulic unit is connected by a ball and socket joint 73 and a rod 75 to the valve 60 and the rod 75 is connected by a universal joint 77 to another rod 79 carried by a piston 81 slidably mounted in a cylinder 83 and yieldingly urged by a spring 85 toward its retracted position. It will be observed that when the piston 81 is moved to its retracted position the valve 60 is retracted from the power transmitting fluid circuit. When pressure is developed within the cylinder 83 the piston 81 overcomes the resistance of the spring 85 and moves the rods 79 and 75 to shift the valve 60 into the power transmitting fluid circuit.

The helical threads 62 carried by the valve 60 and the helically threaded portion 58 of the stationary housing 48 are designed in such a manner, for example as at an angle of 45°, that relatively small angular movement of the valve is required to introduce the valve into the power transmitting fluid circuit.

The driven shaft 46 has a flange 74 supporting a plurality of spaced stub shafts 76 having thereon pinions 78, 80 and 82 of different diameters. The pinion 78 meshes with a gear 84 carried by the driven shaft 24, and the pinion 80 meshes with a sun gear 86 carried by a flange 88 supporting a drum 90, and the pinion 82 meshes with a sun gear 92 carried by a flange 94 supporting a drum 96.

A brake band 98 which may be actuated by a hydraulic unit 99 is adapted to engage the drum 96 and to lock the sun gear 92 against rotation. When the sun gear 92 is locked against rotation the pinion 82 carried by the stub shaft 76 rolls on the sun gear 92, whereupon due to the variation in diameter between the pinions 82 and 78 the gear 84 and final driven shaft 24 are rotated in reverse direction.

A brake shoe 97 which may be actuated by a hydraulic unit 95 is spring-pressed to lock the drum 90, and thereby hold the sungear 86 against rotation. The pinion 80 then rolls on the sun gear 86 and due to the variation of diameter of the gears 78 and 80 drives the gear 84 and the final driven shaft 24 in the forward direction at slower speed.

Fluid pressure may be transmitted to the hydraulic unit 95 of each of the transmissions 20 and 22 by means of conduits 110 communicating with cylinders 114 having therein pistons 116 operated by thrust rods 118 and 119 respectively. Fluid reservoirs 120 communicate with each of the cylinders 114 by way of ports 122 to compensate for variations of the volume of fluid within the cylinders 114 caused by variation of temperature.

Means for actuating the control elements of the transmissions include thrust rods 118 and 119 having threaded end portions 124 and 126 respectively threaded into a sleeve 128 having oppositely directed internal threads engaging the threads on the rods 118 and 119. The sleeve 128 has on one end a pinion 130 meshing with a gear segment 132 fulcrumed on a pin 134 and actuated by a handle 136 as more clearly illustrated in Fig. 3.

The sleeve 128 also has external teeth 138 adapted to be engaged by the teeth 140 of a threaded pinion 142 fixed to a steering shaft 144 and controlled by a steering wheel 146.

Each of the rods 118 and 119 has thereon a cam 150 adapted to engage rollers 152 carried by connecting rods 154 attached to the pistons 66 in the cylinders 64 for actuating the valves 60 to throttle the power transmitting fluid circuit of each of the transmissions 20 and 22.

A normal operation of the structure is as follows: With the control members 136 and 146 in the neutral position as illustrated, the valve members 60 of each of the transmissions 20 and 22 are withdrawn from the power transmitting fluid circuits whereupon power is transmitted from the driving shaft 10 through the driving shaft 18 to energize liquid by the impeller of each unit so as to energize the fluid. The energy of the fluid is received by the turbines operably connected to the driven shaft 46 to propel the vehicle in the forward direction.

When it is desired to make a turn such for example as a turn to the right, the steering wheel 146 is rotated in the clockwise direction whereupon the pinion 142 moves the sleeve 128 toward the right as viewed in Fig. 1. The cam 150 carried by the rod 118 for controlling the right hand transmission 20 engages the roller 152 to actuate the piston 66 thereby developing fluid pressure in the right hand conduit 70 to actuate the valve control member 72 and move the valve shutter 60 into the power transmitting fluid circuit of the transmission 20. The fluid circuit is thus progressively throttled and the power transmitted by the transmission 20 is decreased.

As the efficiency or power output of the transmission 20 decreases by the progressive throttling of its power transmitting fluid circuit, the efficiency or total power transmitted by the transmission 22 automatically increases whereupon a steering force is exerted on the laterally spaced tracks to turn the vehicle gradually to the right.

If more rapid steering is desired, the steering wheel 146 is turned further in the clockwise direction whereupon the rod 118 moves in its associated piston 116 beyond the clearance 160 to engage the piston 116 and move it in the cylinder 114. When fluid pressure is exerted in the cylinder 114 the port 122 acts as a check valve and closes to prevent the escape of liquid from the cylinder 114 to the reservoir 120. Fluid is then transmitted through the conduit 110 to exert pressure within the hydraulic cylinders 95 and 99.

The brake shoe 97 is spring-pressed so as to normally hold the drum 90 against rotation and thus lock the sun gear 86 to effect forward drive. When the shoe 97 is actuated by the hydraulic unit 95, it is moved to its retracted position so as to release the drum 90 and accordingly the sun gear 86. Under this condition, upon actuation of the hydraulic unit 99, the brake band 98 engages and locks the drum 96, and accordingly the sun gear 92, to effect reverse drive.

It will be noted that as the steering wheel 146 is turned further in clockwise direction as pointed out above, the cam 150 of the rod 118 overrides the roller 152 whereupon the spring 85 of the control member 72 for the valve 60 moves the valve to retracted position relative to the power transmitting fluid circuit so that the transmission 20 may transmit power uninterruptedly. Due to the planetary gearing interposed between the driven shaft 46 and the final driven shaft 24, the shaft 24 is driven in reverse direction. During this stage of operation, the transmission 20 operates as a torque converter to transmit power in the reverse direction and the transmission 22 continues to operate as a torque converter transmitting power in the forward direction. The vehicle is thus subjected to forces tending to steer it sharply.

To make a left hand turn the steering wheel 146 is rotated in the counterclockwise direction whereupon the cam 150 carried by the rod 119 actuates its associated valve control member to throttle the power transmitting circuit of the transmission 22 to render it ineffective and decrease the power transmitted by it. As the efficiency of the transmission 22 drops off increased power is transmitted to the transmission 20 to produce a steering force tending to turn the vehicle slowly.

If greater steering force is required, the steering wheel 146 is rotated further in the counterclockwise direction whereupon the left hand control mechanism is actuated to transmit power through the transmission 22 in the reverse direction. When the transmission 22 is transmitting power in the reverse direction and the transmission 20 is transmitting power in the forward direction, rapid turning of the vehicle to the left results.

When it is desired to transmit power to drive the vehicle in the reverse direction, the lever 136 is actuated. The gear segment 132 rotates the pinion 130 and the sleeve 128 which due to the oppositely directed internal threads engaging the oppositely threaded rods 118 and 119 moves the rods outwardly in opposite directions. The cam 150 carried by each of the rods 118 and 119 engage the associated rollers 152 to actuate the cylinder 66 thereby developing fluid pressure in the conduit 70 to operate the valve control member 72 to move the valve shutter 60 into the power transmitting fluid circuit of each of the transmissions 20 and 22 to render them inoperative. The brake band 98 is then actuated to lock the drum 96 and sun gear 92 to transmit power to both final driven shafts in the reverse direction.

Referring to Fig. 6, it will be observed that an alternative design for effecting forward and reverse drive is provided.

A flange 170 carried by the driven shaft 46 supports a housing 172 having a radial flange 174 spaced axially from the flange 170. An axially shiftable member 176 is interposed between the flanges 170 and 174 and is operative when moved axially toward the flange 174 to engage a disk 178 carried by a sleeve 180 operably connected through a pinion 182 and a gear 184 to drive the final driven shaft 26 in the forward direction.

When the member 176 is moved toward the flange 170 it engages a disk 188 carried by a shaft 190 operably connected through gear 192 idler gear 193 to gear 194 with the final driven shaft 26 to drive the final driven shaft in the reverse direction.

The member 176 is moved axially into engagement with the disks 170 or 174 by means of a shifter mechanism 196 including a lever 198 pivoted at 200 and provided with a ball 202 engaging a member 204 to actuate the member 176 axially in opposite directions by means of links 206.

I claim:

1. In a transmission, a driving shaft, a pair of spaced fluid transmissions each including an impeller and a turbine cooperating to provide spaced power transmitting fluid circuits, speed varying means between the driving shaft and the impellers, a stationary member positioned adjacent the power transmitting fluid circuit of each of the fluid transmissions, valve means carried by each of the stationary members, manually operable means to move the valve means into and out of the power transmitting fluid circuit, driven shafts connected to the turbine members, final driven shafts associated with each of the fluid transmissions, forward and reverse planetary gearing interposed between the driven shaft and the final driven shaft of each fluid transmission, and manually operable means to successively move the valve means into the power transmitting fluid circuit of one of the fluid transmissions and to thereafter reverse the direction of power flow through the planetary gearing and thereafter to move the valve means out of the power transmitting fluid circuit.

2. In a transmission a pair of spaced fluid transmissions each including an impeller and a turbine cooperating to provide a power transmitting fluid circuit, valve means shiftable into non-obstructing and obstructing positions relative to the power transmitting fluid circuits, fluid pressure responsive means controlling the valve means, final driven shafts, speed varying planetary gearing between each of the turbine members and its associated final driven shaft, fluid pressure responsive means controlling the planetary gearing, a control mechanism comprising oppositely movable rods having spaced cam members, fluid pressure inducing means adapted to be actuated by each of the cam members upon movement of its associated rod to actuate the fluid pressure responsive means controlling the valve means to successively move the valve means to the obstructing position and to permit the valve means to return to the non-obstructing position as the rod is progressively moved, fluid pressure inducing means operable by movement of said rod and while the valve means is in the obstructing position to actuate the fluid pressure responsive means controlling the planetary gearing, and manually operable means to move the rods in the same direction to vary the power transmitted by one of the fluid transmissions.

3. A control mechanism for a pair of spaced fluid transmissions each having fluid pressure responsive means to obstruct a power transmitting fluid circuit and fluid pressure responsive reversing means comprising a pair of members movable as a unit in one direction or the other to successively actuate the fluid pressure responsive means to obstruct the power transmitting fluid circuit of one of the fluid transmissions and to actuate the reversing means and thereafter to render the obstructing means ineffective, and manually operable means to move said pair of members as a unit.

4. In a vehicle having spaced driven shafts, a fluid transmission connected to each of said shafts and each comprising an impeller and a turbine cooperating to provide a power transmitting fluid circuit, a stationary member, a reactionary member associated with the stationary member, valve means interposed between the impeller and turbine and movable to vary the effective cross sectional area of the power transmitting fluid circuit to decrease the power transmitted by each of said fluid transmissions, manually operable means controlling the position of said valve means whereby the power transmitted to one of said shafts may be progressively decreased while the power transmitted to the other of said shafts may be correspondingly increased to exert a force to steer the vehicle, planetary gearing interposed between the fluid transmissions and each of said shafts, and means controlled by further movement of said manually operable means to actuate the planetary gearing to transmit power to one of the driven shafts in reverse and to transmit power to the other driven shaft in forward direction after the valve means has been actuated thereby exerting a steering force on the vehicle.

5. In a vehicle having a prime mover, means including oppositely directed shafts to propel the vehicle, spaced fluid transmissions, planetary forward and reverse gearing interposed between each of the spaced shafts and fluid transmissions, each of said fluid transmissions comprising an impeller and turbine cooperating to provide a power transmitting fluid circuit, a stationary member, valve means carried by the stationary member and movable into the power transmitting fluid circuit between the impeller and turbine, and manually operable means to successively actuate the valve means to obstruct the power transmitting fluid circuit, reverse the planetary gearing and move the valve means to the non-obstructing portion whereby power may be transmitted to drive said oppositely directed shafts in opposite directions to steer the vehicle.

6. A transmission comprising driving and driven shafts, impeller and turbine wheels carried by the driving and driven shafts and cooperating to provide a power transmitting fluid circuit, a stationary member, valve means carried by the stationary member and movable into the fluid circuit to progressively reduce the cross sectional area thereof and decrease the power transmitted from the impeller to the turbine wheels, manually operable means controlling said valve means, a final driven shaft, forward and reverse planetary gearing interposed between said driven and final driven shafts, and manually operable means to successively actuate the valve means, reverse the planetary gearing and remove the valve means from the power transmitting fluid circuit.

7. In transmission, a driving shaft, a pair of fluid transmissions each including an impeller and a turbine cooperating to provide a power transmitting fluid circuit, a stationary member adjacent each fluid circuit, valve means carried by each of the stationary members, manually operable means comprising oppositely movable rods and cam actuated hydraulic units between the rods and valve means to shift the valve means into and out of obstructing and non-obstructing positions relative to the power transmitting fluid circuits, driven shafts connected to the turbines, final driven shafts, forward and reverse planetary gearing connected between the driven shaft and the final driven shaft of each fluid transmission, pressure responsive means controlling the planetary gearing, and fluid pressure developing means actuated by predetermined movement of one of said oppositely movable rods to reverse the direction of power flow through the planetary gearing and thereafter to move the valve means to the non-obstructing position relative to the power transmitting fluid circuit.

8. In a transmission, a pair of fluid transmissions each including an impeller and a turbine cooperating to provide a power transmitting fluid circuit, valve means shiftable into and out of non-obstructing and obstructing positions relative to the power transmitting fluid circuits, fluid pressure responsive means controlling the valve means, final driven shafts, forward and reverse planetary gearing between each of the turbine members and its associated final driven shaft, fluid pressure responsive means controlling the planetary gearing to release the forward drive and to engage the reverse drive, a control mechanism comprising oppositely movable rods each having a cam thereon, fluid pressure inducing means adapted to be actuated by each of the cams upon movement of its associated rod to actuate the fluid pressure responsive means controlling the valve means to successively move the valve means to the obstructing position and to permit the valve means to return to the non-obstructing position as the rod is progressively moved, fluid pressure inducing means operable by movement of said rod and while the valve means is in the obstructing position to actuate the fluid pressure responsive means controlling the planetary gearing, and manually operable means to move the rods in the opposite directions to reverse the direction of power transmitted by the spaced fluid transmissions.

9. A control mechanism for a pair of spaced fluid transmissions each having fluid pressure responsive means to obstruct a power transmitting fluid circuit and fluid pressure responsive reversing means comprising a pair of members movable as a unit in one direction or the other to successively actuate the fluid pressure responsive means to obstruct the power transmitting fluid circuit of one of the turbo transmissions and to actuate the reversing means and thereafter to render the obstructing means ineffective, and manually operable means to move said pair of members as a unit, and auxiliary manually operable means to simultaneously move said members in opposite directions to reverse the power transmitted by both of said transmissions.

10. A steering control mechanism for a vehicle having a pair of spaced fluid transmissions each having fluid pressure responsive means to obstruct its power transmitting fluid circuit comprising a pair of members movable to actuate the fluid pressure responsive means to obstruct the power transmitting fluid circuit of each of the transmissions, and manually operable means to move said pair of members to obstruct one of said power transmitting fluid circuits to steer the vehicle.

11. In a steering control mechanism for a vehicle having a pair of transmissions each having impeller and turbine members cooperating to provide power transmitting fluid circuits, a stationary member having an axially extending flange for each transmission, a valve member carried by each of the stationary members and movable into its associated power transmitting circuit between the impeller and turbine members, cooperating helical threads between the valve member and the axially extending flange of each transmission, motion transmitting means including interconnected links between each valve member and its associated stationary member to rotate said valve relative to the stationary member to move the valve member into the power transmitting fluid circuit, and fluid pressure actuated means to actuate the motion transmitting means to selectively move one of said valve members into its associated fluid circuit to steer the vehicle.

JOSEPH JANDASEK.